(12) United States Patent
Saitoh

(10) Patent No.: US 10,775,658 B2
(45) Date of Patent: Sep. 15, 2020

(54) LIQUID CRYSTAL DISPLAY DEVICE AND METHOD FOR MANUFACTURING LIQUID CRYSTAL DISPLAY DEVICE

(71) Applicant: SHARP KABUSHIKI KAISHA, Sakai, Osaka (JP)

(72) Inventor: Hajime Saitoh, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 16/359,623

(22) Filed: Mar. 20, 2019

(65) Prior Publication Data

US 2019/0302512 A1 Oct. 3, 2019

Related U.S. Application Data

(60) Provisional application No. 62/649,706, filed on Mar. 29, 2018.

(51) Int. Cl.
*G02F 1/1343* (2006.01)
*G02F 1/1333* (2006.01)
(Continued)

(52) U.S. Cl.
CPC .... *G02F 1/133345* (2013.01); *G02F 1/13439* (2013.01); *G02F 1/133504* (2013.01);
(Continued)

(58) Field of Classification Search
CPC ............ G02F 1/1335; G02F 1/133555; G02F 1/1368; G02F 1/133553; G02F 1/136227;
(Continued)

(56) References Cited

U.S. PATENT DOCUMENTS

2002/0140887 A1 10/2002 Maeda et al.
2005/0175792 A1 8/2005 Maeda et al.
(Continued)

FOREIGN PATENT DOCUMENTS

JP 2000-111906 A 4/2000
JP 2002-357844 A 12/2002
(Continued)

*Primary Examiner* — Thoi V Duong
(74) *Attorney, Agent, or Firm* — ScienBiziP, P.C.

(57) ABSTRACT

A liquid crystal display device including: a reflective region including an insulating resin layer, an inorganic transparent electrode, and a reflective film disposed on the inorganic transparent electrode; and a transmissive region including the insulating resin layer and the inorganic transparent electrode, wherein in the reflective region, the insulating resin layer is provided on a surface with first projections and recesses, the inorganic transparent electrode is disposed on the first projections and recesses, and the reflective film is provided on a surface with finer second projections and recesses than the first projections and recesses, in the transmissive region, the insulating resin layer is provided on the surface with a smooth portion, and the inorganic transparent electrode is disposed on the smooth portion, and the insulating resin layer and the inorganic transparent electrode are each continuously disposed at a boundary between the reflective region and the transmissive region.

3 Claims, 9 Drawing Sheets

(51) Int. Cl.
*G02F 1/1335* (2006.01)
*G02F 1/1362* (2006.01)
*G02F 1/1368* (2006.01)

(52) U.S. Cl.
CPC .. *G02F 1/133553* (2013.01); *G02F 1/136227* (2013.01); *G02F 1/1368* (2013.01); *G02F 1/133555* (2013.01); *G02F 2001/13685* (2013.01)

(58) Field of Classification Search
CPC ......... G02F 1/133345; G02F 1/134309; G02F 1/133707; G02F 1/13439; G02F 1/133514; G02F 1/136209; G02F 1/1337; G02F 1/133512; G02F 1/133528; G02F 1/1343; G02F 1/133504; G02F 1/1362; G02F 1/1333; G02F 1/134336; G02F 1/133711; G02F 2001/134372; G02F 2001/13685; G02F 2201/121; G02F 2201/123; G02F 2203/01; G02F 2203/09; G02F 2203/02; G09G 3/3648; G09G 2300/0456; G09G 2300/0426; G02B 6/0055; G02B 6/0031; G02B 5/12; H01L 33/60

See application file for complete search history.

(56) References Cited

U.S. PATENT DOCUMENTS

| | | |
|---|---|---|
| 2006/0181661 A1 | 8/2006 | Kudou et al. |
| 2007/0064181 A1 | 3/2007 | Maeda et al. |
| 2007/0166628 A1* | 7/2007 | Jung ............... G03F 1/50 430/5 |
| 2007/0222925 A1* | 9/2007 | Park ............... G02F 1/133555 349/114 |
| 2019/0265536 A1* | 8/2019 | Cao ............... G02F 1/13439 |

FOREIGN PATENT DOCUMENTS

| | | |
|---|---|---|
| JP | 2003-114429 A | 4/2003 |
| JP | 2006-221055 A | 8/2006 |

* cited by examiner

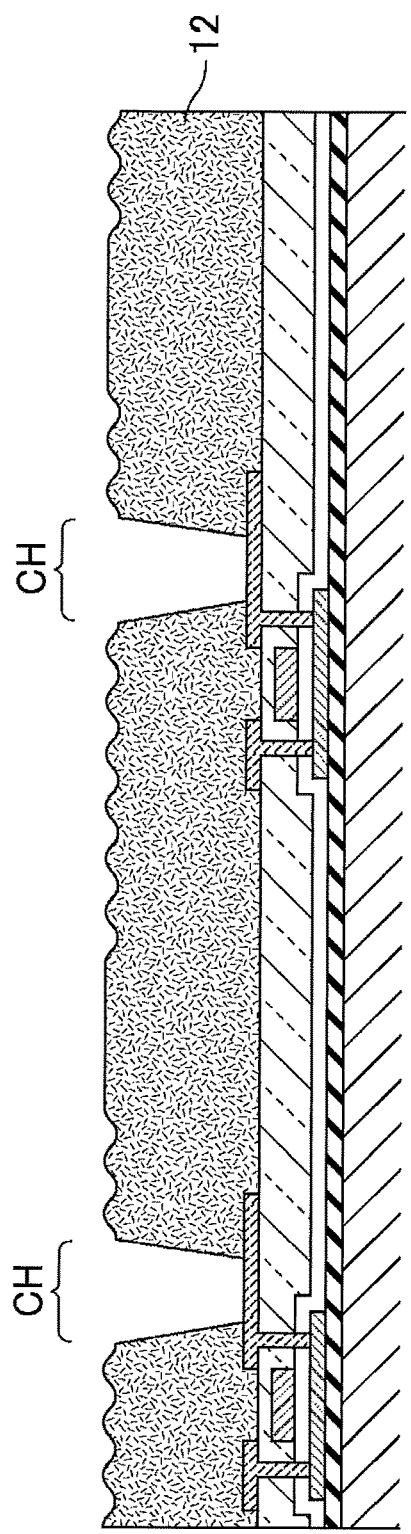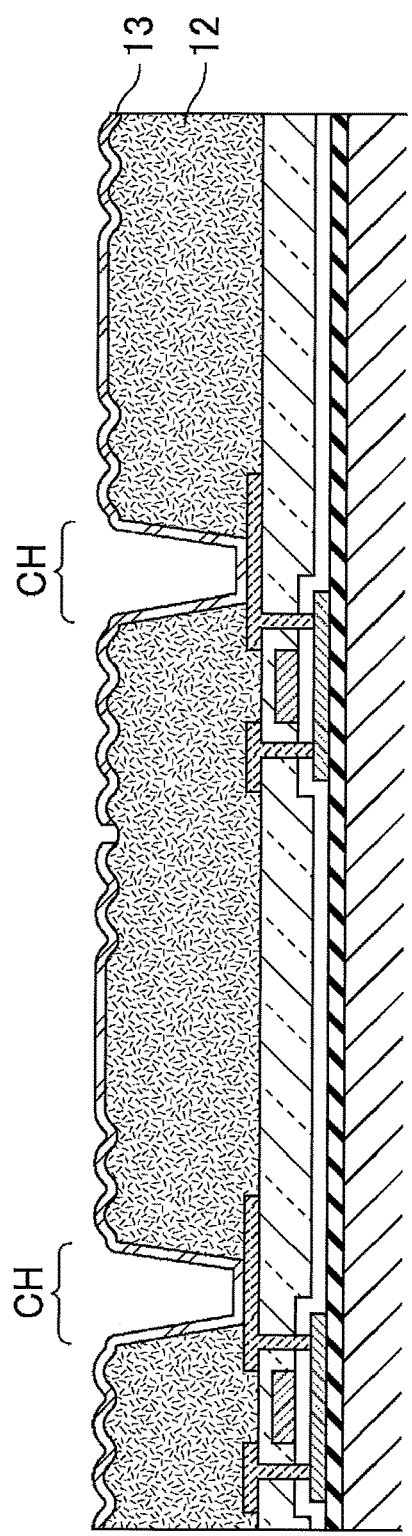

LIQUID CRYSTAL DISPLAY DEVICE AND METHOD FOR MANUFACTURING LIQUID CRYSTAL DISPLAY DEVICE

CROSS-REFERENCE TO RELATED APPLICATIONS

The present application claims priority under 35 U.S.C. § 119 to U.S. Provisional Application No. 62/649,706 filed on Mar. 29, 2018, the contents of which are incorporated herein by reference in their entirety.

BACKGROUND OF THE INVENTION

Field of the Invention

The present invention relates to liquid crystal display devices and methods for producing a liquid crystal display device. Specifically, the present invention relates to a transflective liquid crystal display device and a method for producing a transflective liquid crystal display device.

Description of Related Art

Liquid crystal display devices are roughly classified into the reflective type and the transmissive type based on how light is transmitted through the liquid crystal layer. A reflective liquid crystal display device includes a reflector inside, and provides display by reflecting incident light from the outside on the reflector and allowing the reflected light to pass through the liquid crystal layer (e.g., JP 2003-114429 A and JP 2000-111906 A). A transmissive liquid crystal display device includes a backlight unit, and provides display by allowing light emitted from the backlight unit to pass through the liquid crystal layer. A reflective liquid crystal display device requires no backlight unit, and therefore can achieve low power consumption and reduction in thickness and weight. A transmissive liquid crystal display device, including a light source inside, shows good visibility even in a dark environment. In consideration of not only indoor visibility but also external light visibility, transflective liquid crystal display devices have been developed as liquid crystal display devices having advantages of both the reflective type and the transmissive type (e.g., JP 2002-357844 A and JP 2006-221055 A).

For transmissive liquid crystal display devices and transflective liquid crystal display devices, studies have been made to increase the reflectance in the reflective regions. For example, JP 2003-114429 A, JP 2000-111906 A, JP 2002-357844 A, and JP 2006-221055 A suggest formation of projections and recesses on a surface of a reflector such as a reflective film, a reflective layer, or a reflective electrode.

JP 2003-114429 A discloses a liquid crystal display including a liquid crystal layer between a pair of substrates, an organic film on one of the substrates, and reflective films formed on the organic film by patterning. On the surface of the organic film are formed first projections and recesses. On the surface of each of the reflective films formed on the organic film by patterning are formed second projections and recesses by grain growth. The second projections and recesses are finer than the first projections and recesses of the organic film formed under the reflective film.

JP 2000-111906 A discloses an electro-optic device including a liquid crystal cell including a pair of substrates and a liquid crystal layer between the substrates, and a reflective layer disposed on the liquid crystal layer side surface of one of the substrates. The device includes fine projections and recesses formed on the liquid crystal layer side of the substrate provided with the reflective layer, and the reflective layer on the projections and recesses is a metal film.

JP 2002-357844 A discloses a liquid crystal display device including: a bus line on a substrate, a switching element connected to the bus line, and a reflective electrode connected to the switching element. The surface projections and recesses of the reflective electrode have an average pitch of 1 μm or less.

JP 2006-221055 A discloses a reflector to be used in a liquid crystal display device, including: a first substrate; a second substrate disposed in facing relation to the first substrate; and a liquid crystal layer sandwiched between said first and second substrates, wherein an external light is reflected at a reflector formed on one of the first and second substrates to display images therewith, the reflector including: an organic film; and a reflective film formed covering said organic film therewith, wherein the organic film has first raised and recessed portions at a surface thereof, and second raised and recessed portions formed at a surface of the first raised and recessed portions, the first raised and recessed portions including raised portions and recessed portions at least one of which is arcuate in cross-section, the second raised and recessed portions being smaller in size than the first raised and recessed portions, the reflective film being shaped reflecting the first and second raised and recessed portions.

BRIEF SUMMARY OF THE INVENTION

The present inventor made studies on transflective liquid crystal display devices to increase the reflectance in reflective regions. The inventor then focused on formation of first projections and recesses on a surface of an insulating resin layer, which functions as the base of a reflective film, and formation of second projections and recesses finer than the first projections and recesses on a surface of the reflective film to be disposed above the insulating resin layer.

JP 2003-114429 A discloses in claim 3, for example, a method for producing a reflective liquid crystal display including stacking a reflective film on an organic film while heating a substrate including the organic film, and thereby forming second projections and recesses by grain growth on a surface of the reflective film. JP 2003-114429 A does not mention application of the method to a transflective liquid crystal display device. Yet, if the method is applied to a transflective liquid crystal display device, the insulating resin layer in the transmissive regions is also heated, so that creases are formed in the surface of the insulating resin layer in the transmissive regions. In a transflective liquid crystal display device, the area of the transmissive regions is limited, and thus transmissive regions are required to have a high transmittance. With creases, the surface of the insulating resin layer in the transmissive regions scatters light to have a low transmittance, raising a concern that the display performance of the transflective liquid crystal display device deteriorates.

The method including heating in formation of a reflective film such as a metal film on the insulating resin layer also raises a concern that the insulating resin layer, which is likely to generate gas when heated at high temperatures, generates gas to deteriorate the surface of the metal film, decreasing the reflectance in the reflective regions. Decreasing the heating temperature can reduce formation of creases in the surface of the insulating resin layer, but may lead to a failure in formation of fine second projections and recesses on the surface of the reflective film.

JP 2002-357844 A discloses a transflective liquid crystal display device, and mentions in paragraph [0013] that electrical connections are made in portions where the surrounding of the transparent conductive film constituting pixel electrodes is covered with a metal film constituting a reflective electrode. However, a method of forming a transparent conductive film only in the transmissive regions as in JP 2002-357844 A may result in thin ends of the transparent conductive film or generation of cracks and/or voids at the ends of the transparent conductive film in portions where the transparent conductive film and the metal film are connected, causing defects such as high resistivity or conduction failure.

In response to the above issues, an object of the present invention is to provide a transflective liquid crystal display device with a high reflectance, a high transmittance, and excellent display quality, and a method for producing the liquid crystal display device.

The present inventor focused on the structure of the reflective regions in a transflective liquid crystal display device. The inventor then found that disposing an inorganic transparent electrode formed from an inorganic material between the insulating resin layer and the reflective film prevents creases in the surface of the insulating resin layer even under high temperatures in formation of second projections and recesses on the surface of the reflective film. The inventor also found that disposing the inorganic transparent electrode between the insulating resin layer and the reflective film can reduce a decrease in reflectance in the reflective regions because gas generated from the insulating resin layer reduces deterioration of the reflective film.

The present inventor made studies on a transflective liquid crystal display device to form first projections and recesses on the insulating resin layer in the reflective regions for an increase in reflectance in the reflective regions and to smooth out the surface of the insulating resin layer in the transmissive regions for an increase in transmittance in the transmissive regions. The studies made by the inventor revealed that in the structure including the pixel electrodes (transparent conductive film) only in the transmissive regions with the surrounding of the transparent conductive film covered with a metal film as in JP 2002-357844 A, the surface of the insulating resin layer at the boundaries between the reflective regions and the transmissive regions is recessed, and thus it is difficult to form a reflective film thereon. Hence, at the boundaries between the reflective regions and the transmissive regions, the ends of the transparent conductive film may not be sufficiently covered with the reflective film, which may result in an open circuit.

The present inventor made more studies and found that the continuously formed insulating resin layer and the continuously formed inorganic transparent electrode at boundaries between the reflective regions and the transmissive regions can prevent conduction failure between the reflective regions and the transmissive regions. The inventor thereby successfully achieved the object, completing the present invention.

In other words, one aspect of the present invention is directed to a liquid crystal display device including: a reflective region including an insulating resin layer, an inorganic transparent electrode disposed on the insulating resin layer, and a reflective film disposed on the inorganic transparent electrode; and a transmissive region including the insulating resin layer and the inorganic transparent electrode disposed on the insulating resin layer, wherein in the reflective region, the insulating resin layer is provided on a surface with first projections and recesses, the inorganic transparent electrode is disposed on the first projections and recesses, and the reflective film is provided on a surface with finer second projections and recesses than the first projections and recesses, in the transmissive region, the insulating resin layer is provided on the surface with a smooth portion, and the inorganic transparent electrode is disposed on the smooth portion, and the insulating resin layer and the inorganic transparent electrode are each continuously disposed at a boundary between the reflective region and the transmissive region.

Another aspect of the present invention is directed to a method for producing a liquid crystal display device, the device including a reflective region including an insulating resin layer, an inorganic transparent electrode disposed on the insulating resin layer, and a reflective film disposed on the inorganic transparent electrode, and a transmissive region including the insulating resin layer and the inorganic transparent electrode disposed on the insulating resin layer, the method including: forming the insulating resin layer provided on a surface with first projections and recesses in the reflective region and provided on the surface with a smooth portion in the transmissive region; forming the inorganic transparent electrode on the first projections and recesses and the smooth portion; forming on the inorganic transparent electrode the reflective film provided on a surface with finer second projections and recesses than the first projections and recesses; and removing a portion of the reflective film in the transmissive region.

The liquid crystal display device of the present invention is a transflective liquid crystal display device including reflective regions and transmissive regions and has a high reflectance, a high transmittance, and excellent display quality. The method for producing a liquid crystal display device according to the present invention enables production of a transflective liquid crystal display device having a high reflectance, a high transmittance, and excellent display quality.

BRIEF DESCRIPTION OF THE DRAWINGS

FIGS. 6A and 6B are schematic cross-sectional views showing a process (process B) which forms an inorganic transparent electrode.

DETAILED DESCRIPTION OF THE INVENTION

Hereinafter, an embodiment of the present invention is described. The embodiment, however, is not intended to limit the scope of the present invention. The configurations may be modified as appropriate within the spirit of the present invention.

One aspect of the present invention is directed to a liquid crystal display device including: a reflective region including an insulating resin layer, an inorganic transparent electrode disposed on the insulating resin layer, and a reflective film disposed on the inorganic transparent electrode; and a transmissive region including the insulating resin layer and the inorganic transparent electrode disposed on the insulating resin layer, wherein in the reflective region, the insulating resin layer is provided on a surface with first projections and recesses, the inorganic transparent electrode is disposed on the first projections and recesses, and the reflective film is provided on a surface with finer second projections and recesses than the first projections and recesses, in the transmissive region, the insulating resin layer is provided on the surface with a smooth portion, and the inorganic transparent electrode is disposed on the smooth portion, and the insulating resin layer and the inorganic transparent electrode are each continuously disposed at a boundary between the reflective region and the transmissive region.

Figure 1:
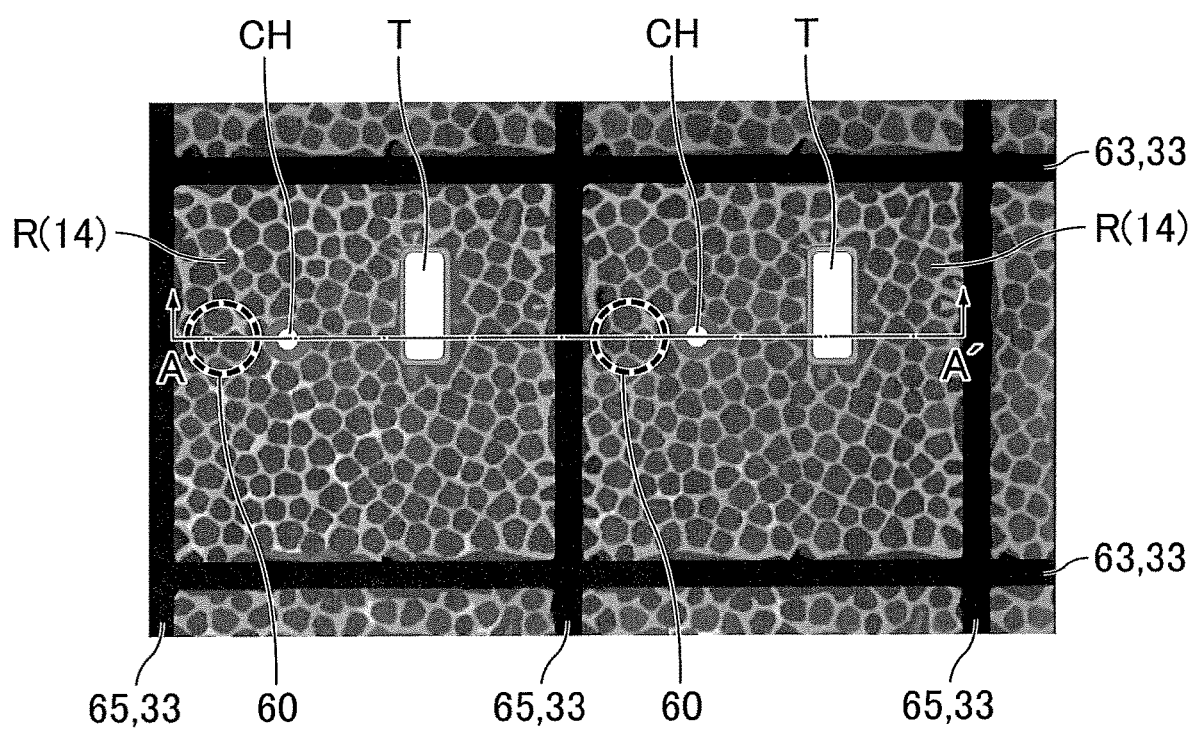
FIG. 1 is a schematic plan view of an exemplary liquid crystal display device of an embodiment.
Figure 2:
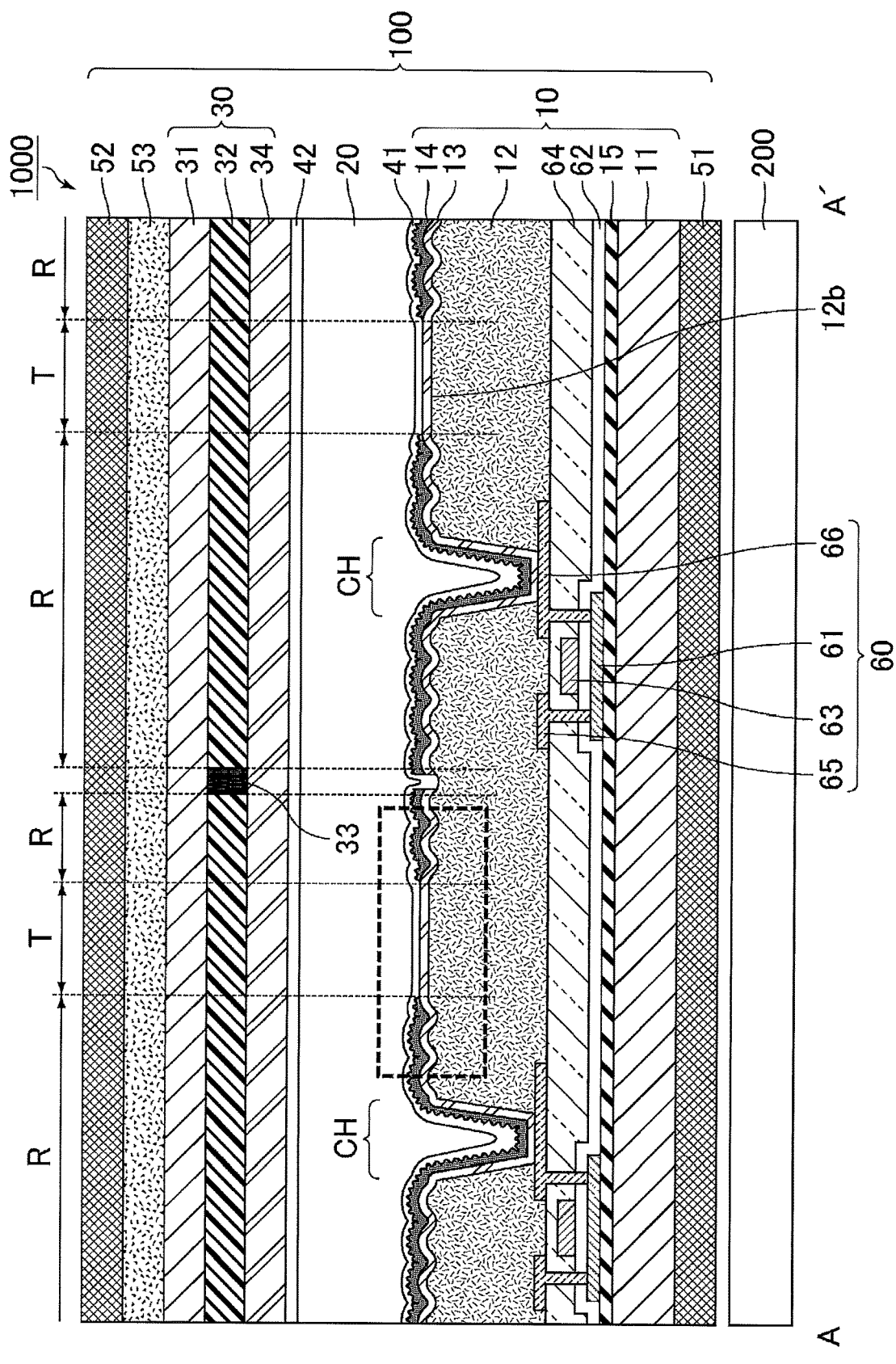
FIG. 2 is a schematic cross-sectional view taken along the A-A' line in FIG. 1.
Figure 3:
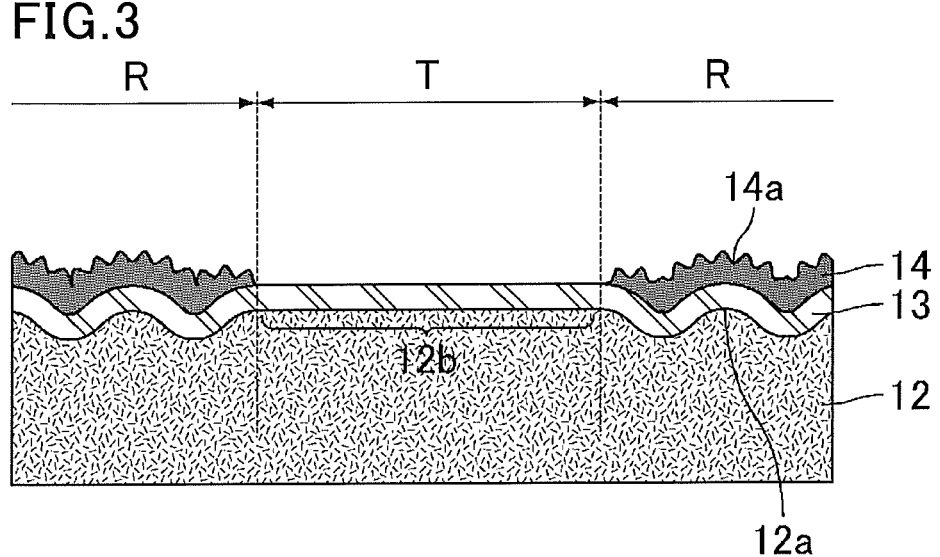
FIG. 3 is an enlarged schematic cross-sectional view of a portion surrounded by a dashed line in FIG. 2.

The structure of the liquid crystal display device of the embodiment is described below with reference to FIGS. 1 to 3. FIG. 1 is a schematic plan view of an exemplary liquid crystal display device of the present embodiment. FIG. 2 is a schematic cross-sectional view taken along the A-A' line in FIG. 1. FIG. 1 and FIG. 2 each show two pixels. FIG. 3 is an enlarged schematic cross-sectional view of a portion surrounded by a dashed line in FIG. 2.

As shown in FIG. 1, a liquid crystal display device 1000 includes reflective regions R and transmissive regions T. The regions where a reflective film 14 is provided are the reflective regions R. The reflective film 14 is provided on the entire region in each pixel, except for the transmissive regions T. The reflective film 14 is not provided in the transmissive regions T. Each pixel preferably includes a reflective region R and a transmissive region T.

As shown in FIG. 2, the liquid crystal display device 1000 includes a backlight unit 200 and a liquid crystal panel 100 including, in the following order from the backlight unit 200 side, a first substrate 10, a liquid crystal layer 20 containing liquid crystal molecules, and a second substrate 30. The reflective regions R mainly contribute to display in a bright environment such as outdoors. In the reflective regions R, display is provided by reflecting external light incident on the liquid crystal layer 20 on the reflective film 14, and allowing the reflected light to pass through the liquid crystal layer 20 again to be emitted to the viewer's side. The transmissive regions T mainly contribute to display in a dark environment such as indoors. In the transmissive regions T, display is provided by allowing light emitted from the backlight unit 200 to pass through the liquid crystal layer 20 to be emitted to the viewer's side.

The structure of the reflective regions R is described. As shown in FIG. 3, the reflective regions R each include an insulating resin layer 12, an inorganic transparent electrode 13 disposed on the insulating resin layer 12, and the reflective film 14 disposed on the inorganic transparent electrode 13. The insulating resin layer 12 is provided on its surface with first projections and recesses 12a. The inorganic transparent electrode 13 is disposed on the first projections and recesses 12a. The reflective film 14 is provided on its surface with second projections and recesses 14a finer than the first projections and recesses 12a. In FIG. 3, an alignment film 41 in FIG. 2 is not illustrated.

The shape of the first projections and recesses 12a on the surface of the insulating resin layer 12 is reflected on the inorganic transparent electrode 13 disposed on the insulating resin layer 12, and also influences the surface shape of the reflective film 14 formed on the inorganic transparent electrode 13. The reflective film 14 is provided on its surface with projections and recesses corresponding to the first projections and recesses 12a, and the projections and recesses mainly function to scatter light in the reflective regions R. The reflective film 14 is also provided with the second projections and recesses 14a on the above projections and recesses. When the projections and recesses formed on the surface of the reflective film 14 are in a single pattern, the periodicity of the projections and recesses may cause interference, leading to color failure where the color is different in observation of the liquid crystal display device at a certain viewing angle. The liquid crystal display device 1000 of the present embodiment includes different patterns for projections and recesses, namely the first projections and recesses 12a and the second projections and recesses 14a, and therefore can increase the reflectance in the reflective regions R and also reduce color failure of the liquid crystal display device. A smoother reflective surface leads to more dominant specular reflection, which reduces the loss of the amount of reflected light. However, a smoother reflective surface leads to higher directivity, narrowing down the viewing angle. In contrast, the reflective surface provided with the projections and recesses dominantly provides scattered reflection and thus increases the viewing angle. However, the reflective surface provided with the projections and recesses leads to a large loss of reflected light, reducing the amount of reflected light. In other words, with a reflective surface provided with projections and recesses in a single pattern, it is difficult to achieve both an increase in reflectance (amount of reflected light) and an increase in viewing angle characteristics. The present invention can therefore enhance the controllability of the reflection characteristics suitable for liquid crystal display device applications by combining different patterns for projections and recesses with different sizes, namely the first projections and recesses 12a and the second projections and recesses 14a.

The first projections and recesses 12a preferably have an arithmetic mean height (Sa) of 100 nm or more. With the first projections and recesses 12a having an arithmetic mean height of 100 nm or more, the reflectance in the reflective regions R can be increased. If the first projections and recesses have an arithmetic mean height of less than 100 nm, a sufficient reflectance may not be achieved in the reflective regions R. The upper limit of the arithmetic mean height of the first projections and recesses 12a is, for example, 300 nm. The "arithmetic mean height" as used herein is measured using a non contact surface roughness measuring device in conformity with ISO 25178. In order to reduce fluctuations in reflectance in the reflective regions R, the first projections and recesses 12a preferably have certain periodicity. If the first projections and recesses 12a are in a formation pattern with an extreme directivity, the viewing angle dependence increases, which may cause color failure due to interference. The first projections and recesses 12a are preferably in a formation pattern of a dot pattern, more preferably a pattern where dot-shaped projections are randomly arranged. A pattern for projections and recesses with high periodicity, such as a stripe pattern or a grid pattern, are not preferred because the resulting reflected light has directivity. The average distance between adjacent first projections and recesses 12a may be, for example, 100 to 50000 nm.

The second projections and recesses 14a preferably have an arithmetic mean height of 10 nm or more and less than 100 nm. With the second projections and recesses 14a having an arithmetic mean height falling within the above range, the reflectance in the reflective regions R can be further increased and the interference of light due to the periodicity of the projections and recesses is reduced, so that the color failure of the liquid crystal display device can be effectively reduced. The lower limit of the arithmetic mean height of the second projections and recesses 14a is more preferably 20 nm, and the upper limit thereof is more preferably 50 nm.

The liquid crystal display device 1000 includes, in the reflective regions R, the inorganic transparent electrode 13 between the insulating resin layer 12 and the reflective film 14. This structure prevents gas generated from the insulating resin layer 12 from coming into contact with the reflective film 14 even when the insulating resin layer 12 is heated in formation of the second projections and recesses 14a on the surface of the reflective film 14. The structure therefore prevents a decrease in reflectance of the reflective film 14 due to reaction between the gas and the reflective film 14.

The structure of the transmissive regions T is described. As shown in FIG. 3, the transmissive regions T each include the insulating resin layer 12 and the inorganic transparent electrode 13 disposed on the insulating resin layer 12. The insulating resin layer 12 in transmissive regions T is provided on its surface with the smooth portions 12b. In the transmissive regions T, the insulating resin layer 12 is not provided on its surface with the first projections and recesses 12a and has a smooth surface, whereby the transmittance in the transmissive regions T can be increased. In the transmissive regions T, the inorganic transparent electrode 13 is disposed on the smooth portions 12b. The surface of the inorganic transparent electrode 13 is also smooth in the transmissive regions T.

The smooth portions 12b preferably have an arithmetic mean height of less than 10 nm. If the smooth portions 12b have an arithmetic mean height of more than 10 nm, the transmittance in the transmissive regions T may decrease.

The insulating resin layer 12 and the inorganic transparent electrode 13 are each continuously disposed at boundaries between the reflective regions R and the transmissive regions T. This structure can prevent conduction failure between the reflective regions R and the transmissive regions T. For example, as in JP 2002-357844 A, a structure may be possible in which a transparent conductive film is formed only in the transmissive regions, and a metal film alone without the transparent conductive film is formed in the reflective regions, with the transparent conductive film and the metal film being electrically connected at boundaries between the transmissive regions and the reflective regions. This structure, however, may open-circuit the portions where the transparent conductive film and the metal film are connected, when the ends of the transparent conductive film are not sufficiently covered with the metal film. This tends to cause conduction failure between the reflective regions and the transmissive regions. Especially if this structure is applied to the liquid crystal display device 1000, it would be difficult to cover the ends of the inorganic transparent electrode 13 with the reflective film 14 since the insulating resin layer 12, which is the base layer for the inorganic transparent electrode 13 and the reflective film 14, is designed to be provided with the first projections and recesses 12a in the reflective regions R and with the smooth portions 12b in the transmissive regions T, whereby the boundaries between the reflective regions R and the transmissive regions T are recessed and not smooth. Hence, in the present embodiment, the insulating resin layer 12 and the inorganic transparent electrode 13 are each continuously disposed at the boundaries between the reflective regions R and the transmissive regions T, preventing conduction failure of the liquid crystal display device.

The insulating resin layer 12 is an insulating base layer for the inorganic transparent electrode 13. The insulating resin layer 12 is disposed between the inorganic transparent electrode 13 and the later-described gate lines and source lines. The insulating resin layer 12 may contain a photosensitive resin. The photosensitive resin is a resin that undergoes a structural change when irradiated with light and thereby exhibits different physical properties. The resin may be one that dissolves when irradiated with light or one that solidifies when irradiated with light. The light to be applied to the photosensitive resin is, for example, ultraviolet light.

Examples of the photosensitive resin include acrylic resins, polyimide resins, and novolac resins. The insulating resin layer 12 may be formed from the photosensitive resin in combination with, for example, silicon oxide ($SiO_2$), silicon oxynitride ($SiONy$), or silicon nitride ($SiN$).

The insulating resin layer 12 has a thickness of, for example, 1 to 5 μm. The thickness of the insulating resin layer 12 does not include the heights of the first projections and recesses 12a, and is a thickness of the insulating resin layer 12 measured in a transmissive region T.

The inorganic transparent electrode 13 may be a pixel electrode disposed in each pixel. The inorganic transparent electrode is formed from an inorganic material, and thus can be formed even at low temperatures from room temperature (20° C. to 25° C.) to about 100° C. This can form the inorganic transparent electrode 13 on the insulating resin layer 12 without creases due to heating in the surface of the insulating resin layer 12.

The inorganic transparent electrode 13 may be formed from, for example, an inorganic oxide material such as indium tin oxide (ITO), indium zinc oxide (IZO), titanium oxide (TiO), zinc oxide (ZnO), or tin oxide (SnO), or an alloy containing any of these materials. In particular, the inorganic transparent electrode 13 is preferably formed from ITO or IZO, for their low resistance and excellent optical characteristics. The inorganic transparent electrode 13 may be a single layer formed from the above inorganic oxide material or alloy, or may be a stack of such layers.

The inorganic transparent electrode 13 has a thickness of, for example, 10 to 1000 nm. The lower limit of the thickness of the inorganic transparent electrode 13 is more preferably 50 nm, and the upper limit thereof is preferably 300 nm.

The reflective film 14 is a layer that reflects external light incident on the liquid crystal panel 100 from the viewer's side (second substrate 30 side) of the liquid crystal display device to the viewer's side. The reflective film 14 may be any layer that can reflect external light, but is preferably a metal film. The reflective film 14 may be formed from a metal such as aluminum (Al), platinum (Pt), or silver (Ag), or an alloy containing these metals, for their high reflectance. The reflective film 14 may be a single layer formed from the above metal or alloy, or may be a stack of such layers.

The reflective film 14 has a thickness of, for example, 10 to 1000 nm. The lower limit of the thickness of the reflective film 14 is preferably 50 nm, and the upper limit thereof is more preferably 300 nm. The thickness of the reflective film 14 does not include the heights of the second projections and recesses 14a.

The first substrate 10 may be an active matrix substrate (TFT substrate). The TFT substrate can be one usually used in the field of liquid crystal display devices. The TFT substrate in a plan view may have a structure including parallel gate lines 63; parallel source lines 65 formed in the direction crossing the gate lines 63; and thin film transistors (hereinafter, also referred to as TFTs) 60 disposed at the respective intersections of the gate lines 63 and the source lines 65, although these members are shielded with the black matrix 33 in FIG. 1. The TFT substrate includes regions (pixels) partitioned in a matrix pattern by the gate lines 63 and the source lines 65.

The TFTs 60 may be formed on a base coat layer 15 formed on a transparent substrate 11 as shown in FIG. 2. The TFTs 60 can be those usually used in the field of liquid crystal display devices. Although FIG. 2 shows top-gate TFTs, bottom-gate TFTs are also usable. The TFTs 60 are each composed of, for example, an oxide semiconductor layer 61 disposed on the base coat layer 15, a gate line 63 disposed on the oxide semiconductor layer 61 via a gate insulator 62, and a source line 65 and a drain line 66 formed on the gate line 63 via an interlayer insulating film 64 and facing each other. The interlayer insulating film 64 and the gate insulator 62 are each partially removed. Through the removed portions, the source line 65 and the drain line 66 are each electrically connected to the oxide semiconductor layer 61. The inorganic transparent electrode 13 is electrically connected to the drain line 66 of the TFT 60 through a contact hole CH. When the reflective film 14 is conductive, the reflective film 14 may also be electrically connected to the drain line 66 of the TFT 60 through the contact hole CH.

On the transparent substrate 11 side surface of the oxide semiconductor layer 61 may be disposed a shielding member to prevent noise (off-leakage current) due to light emitted from the backlight unit 200. The shielding member may be any member that can block light, and may be formed from any material.

Examples of the transparent substrate 11 include glass substrates; silicon substrates; and resin substrates such as a plastic or polycarbonate substrate.

The base coat layer 15, the gate insulator 62, and the interlayer insulating film 64 may each have any structure and may be one usually used in the field of liquid crystal display devices. The base coat layer 15 is used to control the quality of the oxide semiconductor layer. The gate insulator 62 and the interlayer insulating film 64 are insulating films. The base coat layer 15, the gate insulator 62, and the interlayer insulating film 64 may each be an inorganic insulating film or an organic insulating film. The inorganic insulating film can be formed from, for example, silicon oxide ($SiO_2$), silicon oxynitride ($SiONy$), or silicon nitride (SiN). The organic insulating film can be formed from, for example, an acrylic resin, a polyimide resin, or a novolac resin. The base coat layer 15, the gate insulator 62, and the interlayer insulating film 64 may each be a single layer or a stack of such layers.

The liquid crystal layer 20 may be any layer containing at least one type of liquid crystal molecules, and may be one usually used in the field of liquid crystal display devices. The liquid crystal molecules may be of a negative liquid crystal material whose anisotropy of dielectric constant ($\Delta\varepsilon$) defined using the following formula is negative, or a positive liquid crystal material whose anisotropy of dielectric constant ($\Delta\varepsilon$) defined using the following formula is positive.

$\Delta\varepsilon$=(dielectric constant in major axis direction of liquid crystal molecule)−(dielectric constant in minor axis direction of liquid crystal molecule)

The second substrate 30 may be a color filter substrate (hereinafter, also referred to as a CF substrate). The CF substrate may have a structure including, for example, as shown in FIG. 2, color filters 32 disposed on a transparent substrate 31, and an inter-pixel light-shielding layer (e.g., black matrix 33) disposed between adjacent color filters. The color filters 32 may include, for example, red color filters, green color filters, and blue color filters. The structure of the second substrate 30 may be common between the transmissive regions T and the reflective regions R. The second substrate 30 may include a second electrode 34 (also referred to as a counter electrode) on its liquid crystal layer 20 side.

In the case where the second substrate 30 includes the second electrode 34, a vertical electric field is generated in the thickness direction of the liquid crystal layer 20 between the inorganic transparent electrode 13 (pixel electrode) in the first substrate 10 and the second electrode 34 (counter electrode) in the second substrate 30 when voltage is applied to the liquid crystal display device 1000. The electric field generated in the liquid crystal layer 20 changes the alignment of liquid crystal molecules and thereby control the amount of light emitted from the viewer's side of the liquid crystal panel 100, providing display.

On the liquid crystal layer 20 side of the first substrate 10 and the liquid crystal layer 20 side of the second substrate 30 may be disposed the alignment films 41 and 42, respectively. The alignment azimuth of liquid crystal molecules with no voltage applied is controlled by the alignment controlling force of the alignment films 41 and 42. The expression "with no voltage applied" includes the cases where the voltage applied to the liquid crystal layer is 0 V as well as the cases where a voltage of less than the threshold voltage for liquid crystal molecules is applied. The alignment films 41 and 42 may each be of any type, and can be one usually used in the field of liquid crystal display devices.

The liquid crystal panel 100 may include a polarizing plate 51 on the side remote from the liquid crystal layer 20 of the first substrate 10, and a polarizing plate 52 on the side remote from the liquid crystal layer 20 of the second substrate 30. The polarizing plates 51 and 52 may be any polarizing plates, and can be ones usually used in the field of liquid crystal display devices. The polarizing plates 51 and 52 are preferably linear polarizing plates. The polarizing plate 51 and the polarizing plate 52 are disposed such that their polarization axes are perpendicular to each other.

A birefringent film 53 may be disposed between the second substrate 30 and the polarizing plate 52. The birefringent film 53 is an optical member that converts light, having been incident on the viewer's side of the liquid crystal panel 100 and converted into linearly polarized light by the polarizing plate 52, into circularly polarized light. The birefringent film 53 can be, for example, a λ/4 plate.

The backlight unit 200 can be one usually used in the field of liquid crystal display devices. The backlight unit 200 may be any backlight unit capable of being disposed on the back surface of the liquid crystal panel 100 and emitting light produced therein to the viewer's side through the transmission regions T of the liquid crystal panel 100. The backlight unit 200 may be a direct-lit type one or an edge-lit type one.

The liquid crystal display device 100 may include, in addition to the liquid crystal display panel 100 and the backlight unit 200, members such as external circuits, including a tape carrier package (TCP) and a printed circuit board (PCB); optical films, including a viewing angle-increasing film and a luminance-increasing film; and a bezel (frame). Some members may be incorporated into other members. The liquid crystal panel 100 may be a memory liquid crystal panel configured to control the TFTs 60 using static random access memory (SRAM) circuits of the respective pixels. The driver circuit configured to drive the pixels may be formed outside the display region in the first substrate 10 simultaneously with the TFTs 60, or may be externally connected to the liquid crystal panel. Members other than those already described are not particularly limited. The members can be ones usually used in the field of liquid crystal display devices, and thus will not be elaborated upon here.

<Method for Producing Liquid Crystal Display Device>

Another aspect of the present invention is a method for producing a liquid crystal display device, the device including a reflective region including an insulating resin layer, an inorganic transparent electrode disposed on the insulating resin layer, and a reflective film disposed on the inorganic transparent electrode, and a transmissive region including the insulating resin layer and the inorganic transparent electrode disposed on the insulating resin layer, the method including: forming the insulating resin layer provided on a surface with first projections and recesses in the reflective region and provided on the surface with a smooth portion in the transmissive region (hereinafter, also referred to as Process A); forming the inorganic transparent electrode on the first projections and recesses and the smooth portion (hereinafter, also referred to as Process B); forming on the inorganic transparent electrode the reflective film provided on a surface with finer second projections and recesses than the first projections and recesses (hereinafter, also referred to as Process C); and removing a portion of the reflective film in the transmissive region (hereinafter, also referred to as Process D). An exemplary method for producing a liquid crystal display device is described below with reference to FIGS. 4 to 7.

Figure 4:
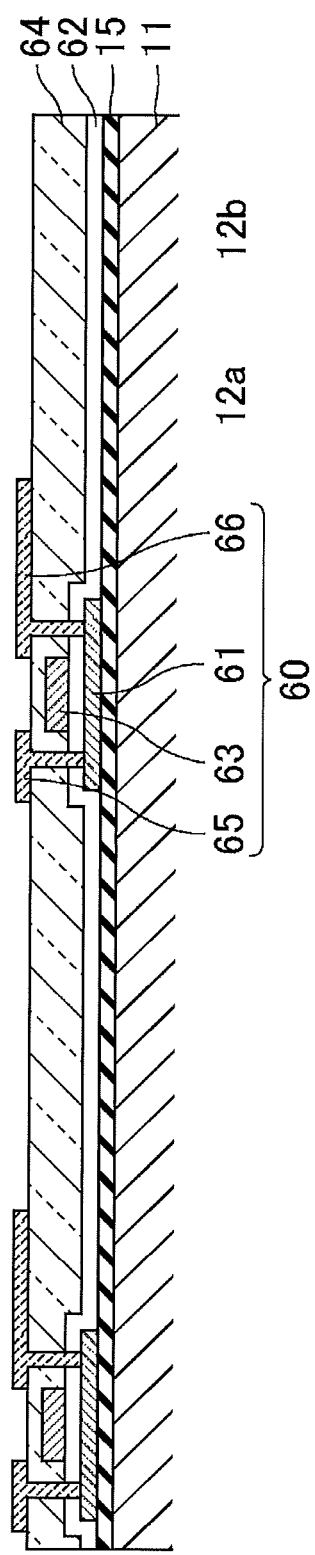
FIG. 4 is a schematic cross-sectional view of a substrate including TFTs.

FIG. 4 is a schematic cross-sectional view of a substrate including TFTs. FIG. 4 shows an exemplary case where top-gate TFTs are formed on the transparent substrate 11 such as a glass substrate. Yet, the TFTs 60 may be of the top-gate type or the bottom-gate type. The TFTs 60 have the structure as described above, and will not be elaborated upon here.

Figure 5A:
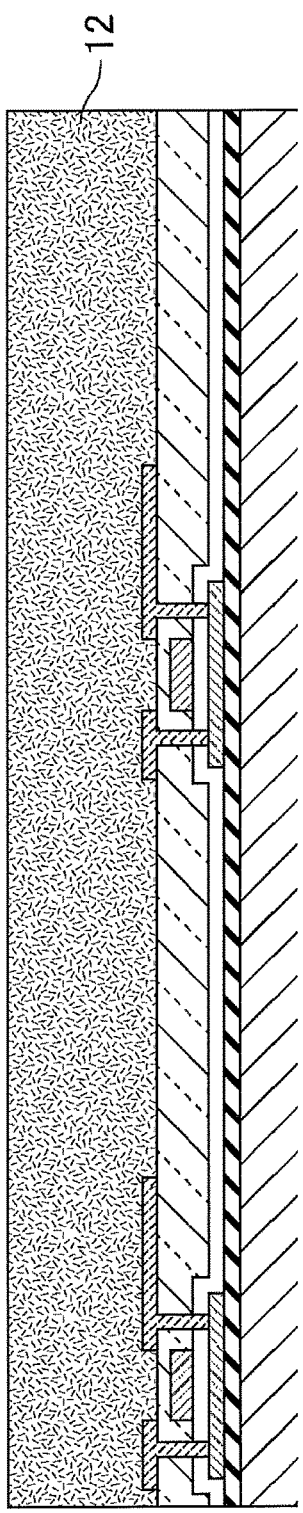
FIGS. 5A to 5C are schematic cross-sectional views showing a process (process A) which forms an insulating resin layer provided with first projections and recesses and smooth portions.
Figure 5B:
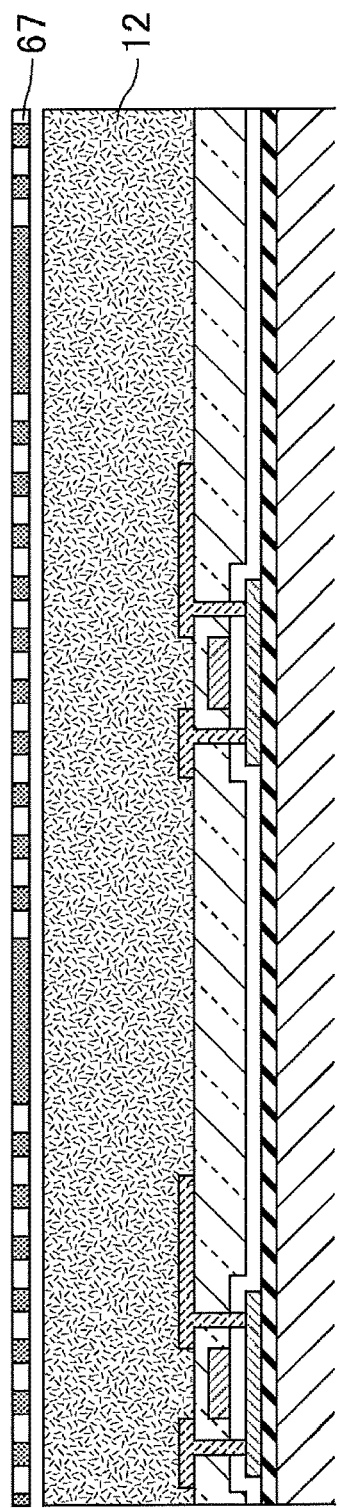
Figure 5C:
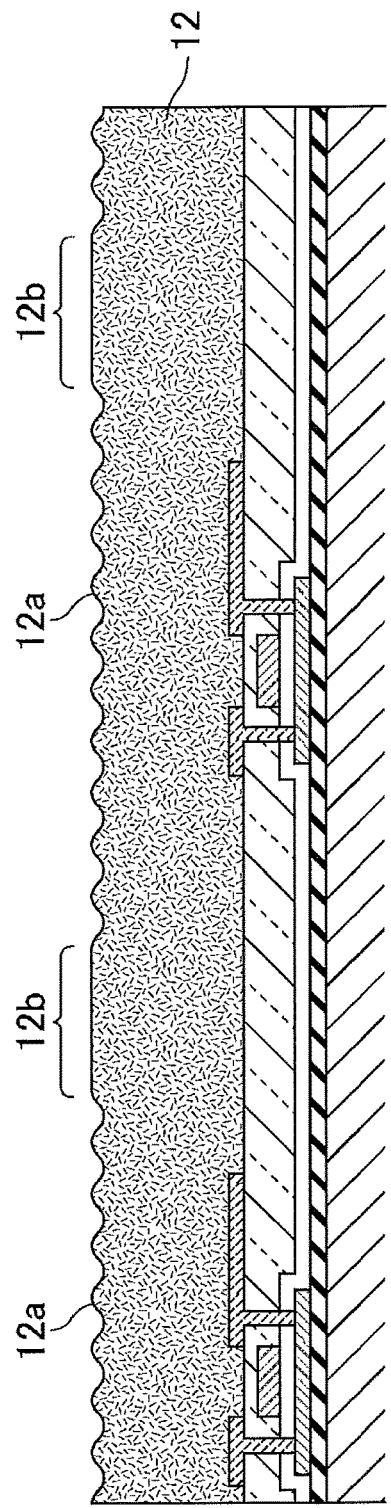

FIGS. 5A to 5C are schematic cross-sectional views showing a process (process A) which forms an insulating resin layer provided with first projections and recesses and smooth portions. In the process (Process A) including forming the insulating resin layer 12 provided on its surface with the first projections and recesses 12a in the reflective regions R and provided on its surface with the smooth portions 12b in the transmissive regions T, the insulating resin layer 12 is formed first, and then the first projections and recesses 12a and the smooth portions 12b are formed.

The insulating resin layer 12 preferably contains a photosensitive resin, and the process (Process A) including forming the insulating resin layer 12 provided with the first projections and recesses 12a and the smooth portions 12b is preferably performed by photolithography. The photolithography enables selection of regions in which projections and recesses are formed, so that the first projections and recesses 12a can be formed only on the insulating resin layer 12 in the reflective regions R, and the smooth portions 12b can be formed on the insulating resin layer 12 in the transmissive regions T, without the first projections and recesses 12a formed. The first projections and recesses 12a preferably have periodicity in order to reduce fluctuations in reflectance. However, the projections and recesses having periodicity may contribute to interference of reflected light to change the displayed color on the liquid crystal display device, which may be observed as color failure. An effective way to achieve both reduction of fluctuations in reflectance and reduction of color failure is to artificially alter the periodicity of the first projections and recesses 12a. The method including forming creases in the insulating resin layer by heating as disclosed in JP 2003-114429 A merely forms the first projections and recesses 12a in a self-alignment manner. The method therefore would fail to artificially alter the periodicity of the first projections and recesses 12a. Optimization using such a method is thus difficult. In contrast, the photolithography enables formation of a pattern with periodicity which is controlled as desired. The photolithography therefore enables reduction of color failure due to the periodicity of the pattern of the projections and recesses while reducing fluctuations in reflectance of the reflective regions R due to unevenness of the shape of the first projections and recesses 12a.

Hereinafter, the case where Process A is performed by photolithography is described with reference to FIGS. 5A to 5C. Process A includes, for example, formation of an insulating resin layer (FIG. 5A), placement of a photomask (FIG. 5B), exposure, and development (FIG. 5C). FIGS. 5A to 5C illustrate the case where a photosensitive resin causing the insulating resin layer 12 to dissolve under light is used.

As shown in FIG. 5A, a photosensitive resin composition is applied to the entire surface of the transparent substrate 11 including the TFTs 60 in the reflective regions R and the transmissive regions T, followed by drying the composition. Thereby, the insulating resin layer 12 is formed.

As shown in FIG. 5B, the portions of the surface in the reflective regions R and to be left as the projections of the first projections and recesses 12a, and the portions of the surface in the transmissive regions T and to be left as the smooth portions 12b are shielded from light with a photomask 67. Then, the surface is irradiated with ultraviolet light such that the first projections and recesses 12a have the desired surface roughness.

The layer is developed as shown in FIG. 5C by a method such as one using a developer, so that the insulating resin layer 12 can be formed which is provided on its surface with the first projections and recesses 12a in the reflective regions R and is provided on its surface with the smooth portions 12b in the transmissive regions T.

FIGS. 6A and 6B are schematic cross-sectional views showing a process (process B) which forms an inorganic transparent electrode. Process B includes forming the inorganic transparent electrode 13 on the first projections and recesses 12a and on the smooth portions 12b. The inorganic transparent electrode 13, mainly containing an inorganic oxide material such as ITO, shows a small change in coefficient of thermal expansion, and is less likely to be deformed by heat. Hence, the inorganic transparent electrode 13 formed on the insulating resin layer 12 can prevent creases in the surface of the insulating resin layer 12 even when the formation temperature is increased to form the reflective film 14 or to form the second projections and recesses 14a on the surface of the reflective film 14 in a subsequent process. The inorganic transparent electrode 13 thereby enables formation of the first projections and recesses 12a and the later-described second projections and recesses 14a while maintaining the smoothness of the smooth portions 12b of the insulating resin layer 12. The inorganic transparent electrode 13 also reduces deterioration of the reflective film 14 due to gas generated from the insulating resin layer 12 under heat, thereby reducing a decrease in reflectance in the reflective regions R. Moreover, this structure can prevent creases in the surface of the insulating resin layer 12 under heat, facilitating the temperature control in forming the later-described second projections and recesses 14a in the surface of the reflective film 14. Thereby, the liquid crystal display devices can be produced with a high yield.

In Process B, as shown in FIG. 6A, the contact holes CH are formed at positions overlapping the drain lines 66. The contact holes CH can be formed by a method such as photolithography or etching.

On both the first projections and recesses 12a and the smooth portions 12b of the insulating resin layer 12 is formed the inorganic transparent electrode 13. The inorganic transparent electrode 13 can be formed by a known method such as chemical vapor deposition (CVD) or sputtering. The temperature in formation of the inorganic transparent electrode 13 can appropriately be set between room temperature and a temperature at which the smoothness of the smooth portions 12b on the insulating resin layer 12 in the transmissive regions T is not spoiled. Although depending on the type of the resin used for the insulating resin layer 12, the upper limit of the film forming temperature is 250° C., for example. Also, after the formation of the inorganic transparent electrode 13, the inorganic transparent electrode 13 may be further baked to increase the contact with the insulating resin layer 12. Then, the portions of the electrode at the boundaries between the pixels are removed to separate the pixels as shown in FIG. 6B, so that the inorganic transparent electrode 13 is formed in each and every pixel. The electrode portions can be removed by a method such as photolithography or etching. The insulating resin layer 12 side surface of the inorganic transparent electrode 13 reflects the shapes of the first projections and recesses 12a and the smooth portions 12b on the surface of the insulating resin layer 12, which functions as the base.

The inorganic transparent electrode 13 is formed in the contact holes CH to be electrically connected to the drain lines 66. Although FIG. 6A shows that the contact holes CH are formed before formation of the inorganic transparent electrode 13, the contact holes CH may be formed after the formation of the inorganic transparent electrode 13.

Figure 7A:
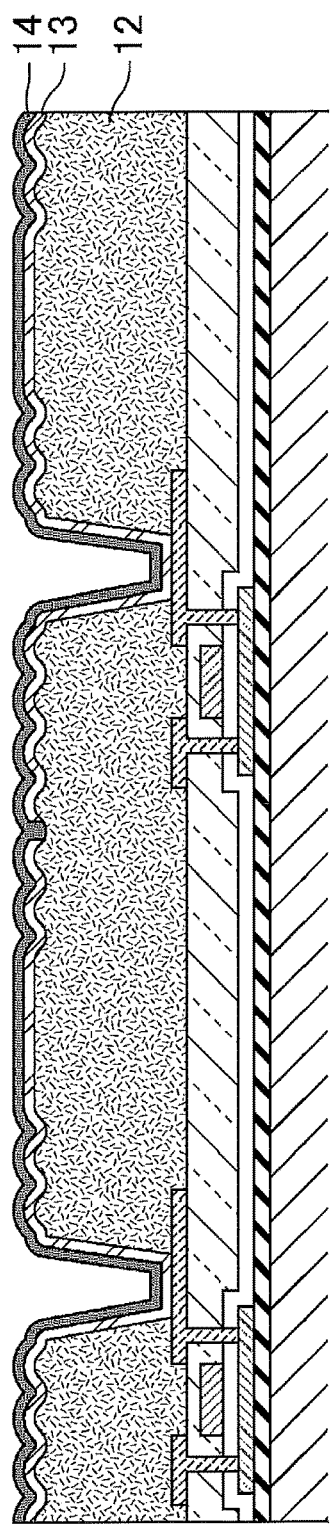
FIGS. 7A and 7B are schematic cross-sectional views showing a process (process C) which forms a reflective film provided with second projections and recesses.
Figure 7B:
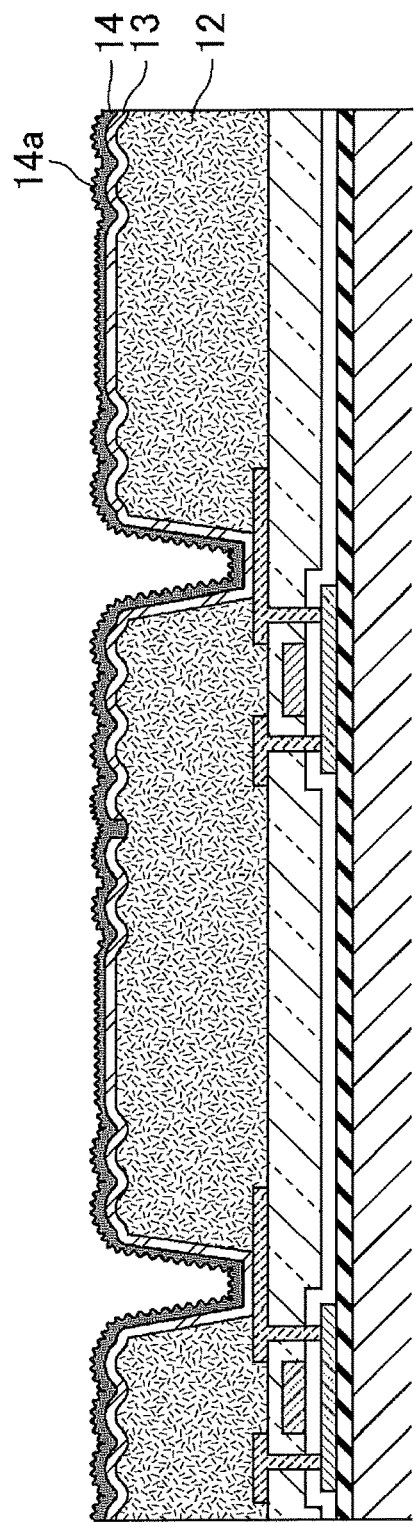

FIGS. 7A and 7B are schematic cross-sectional views showing a process (process C) which forms a reflective film provided with second projections and recesses. In Process C, the reflective film 14 provided with the second projections and recesses 14a finer than the first projections and recesses 12a is formed on the inorganic transparent electrode 13. Process C may include forming the reflective film 14 on the inorganic transparent electrode 13 as shown in FIG. 7A, followed by forming the second projections and recesses 14a as shown in FIG. 7B. Also, the reflective film 14 and the second projections and recesses 14a may be simultaneously formed as shown in FIG. 7B without the process shown in FIG. 7A.

The method to form the second projections and recesses 14a after formation of the reflective film 14 on the inorganic transparent electrode 13 is described. As shown in FIG. 7A, the reflective film 14 is formed on all the surfaces of the portions of the inorganic transparent electrode 13 corresponding to the reflective regions R and the portions corresponding to the transmissive regions T. The reflective film 14 can be formed by a known method such as sputtering or vapor deposition. The reflective film 14 may be a metal film. The formation temperature for the reflective film 14 is preferably 100° C. to 250° C. The lower limit of the formation temperature is more preferably 180° C. Then, as shown in FIG. 7B, the second projections and recesses 14a finer than the first projections and recesses 12a are formed on the surface of the reflective film 14. The second projections and recesses 14a are formed on the entire surface of the reflective film 14 formed in FIG. 7A. The second projections and recesses 14a can be formed by chemically or physically etching the surface of the reflective film 14.

The method to simultaneously form the reflective film 14 and the second projections and recesses 14a is described. Without the process shown in FIG. 7A, the second projections and recesses 14a are formed while the reflective film 14 is formed. Since the reflective film 14 and the second projections and recesses 14a can be simultaneously formed, the number of processes and the production cost can be reduced. The method to simultaneously form the reflective film 14 and the second projections and recesses 14a can be a method including forming a metal film by a known method such as sputtering or vapor deposition and allowing the metal particles constituting the metal film to undergo metal grain growth. The method to cause metal grain growth may be, for example, a method including forming a metal film in a gaseous atmosphere of Ar or $N_2$, for example, introduced at a pressure of 0.01 to 10 Pa while heating the substrate. The formation temperature for the metal film is preferably 180° C. to 250° C., as such a temperature promotes the metal grain growth. In the case of causing metal grain growth, it is important to form the second projections and recesses 14a while forming the metal film 14. Once a smooth metal film is formed, the metal grain growth does not occur even when the film-forming temperature is increased to the above temperature range.

In the method for producing a liquid crystal display device according to the present invention, the second projections and recesses 14a are formed with the inorganic transparent electrode 13 between the insulating resin layer 12 and the reflective film 14, regardless of whether the second projections and recesses 14a are formed after the formation of the reflective film 14 on the inorganic transparent electrode 13 or the reflective film 14 and the second projections and recesses 14a are formed simultaneously. Hence, the insulating resin layer 12 and the reflective film 14 are not in contact with each other, so that the creases formed due to a difference in coefficient of thermal expansion between the insulating resin layer 12 and the reflective film 14 are not transferred to the surface of the insulating resin layer 12. The smoothness of the smooth portions 12b formed on the insulating resin layer 12 can therefore be maintained.

Figure 8:
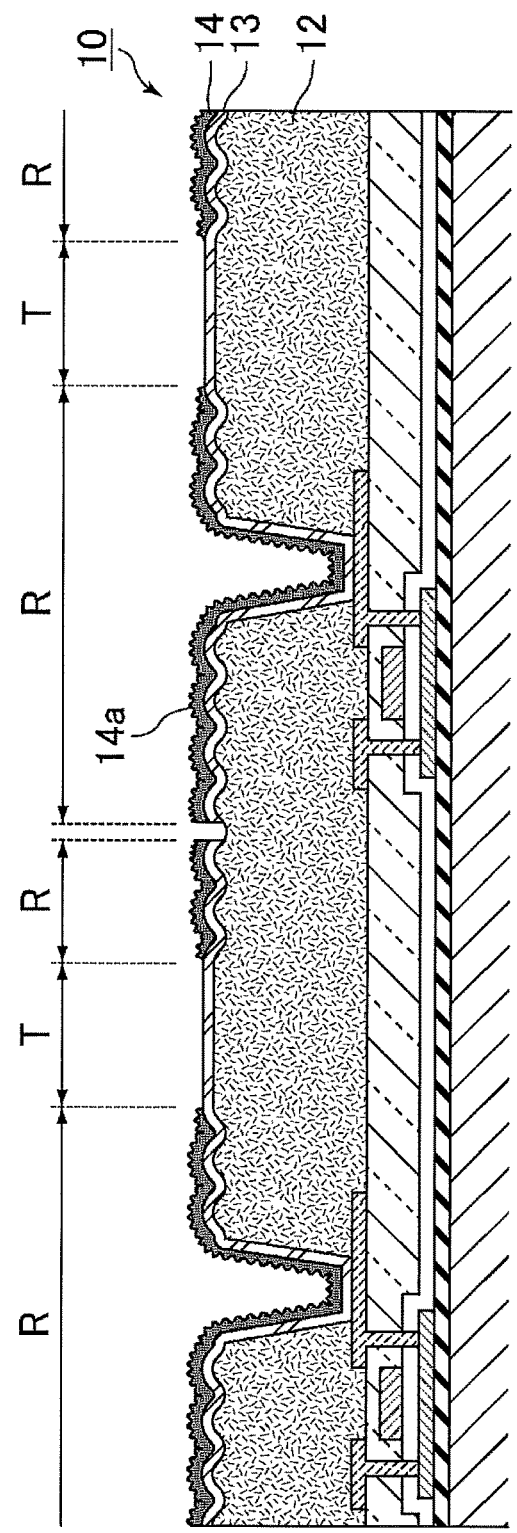
FIG. 8 is a schematic cross-sectional view showing a process (process. D) which removes the reflective film.

FIG. 8 is a schematic cross-sectional view showing a process (process D) which removes the reflective film. As shown in FIG. 8, in Process D, the portions of the reflective film 14 in the transmissive regions T are removed. The portions of the reflective film 14 can be removed by a method such as photolithography or etching. Here, the portions of the reflective film 14 at the boundaries between the pixels may be removed to separate the pixels. Thereby, the first substrate 10 is completed.

In the above processes, the insulating resin layer 12 and the inorganic transparent electrode 13 are each continuously disposed at the boundaries between the reflective regions R and the transmissive regions T. This structure enables prevention of conduction failure between the reflective regions R and the transmissive regions T. In particular, when Process A is performed by photolithography, recesses are likely to be formed at the boundaries between the first projections and recesses 12a and the smooth portions 12b. Thus, continuously disposing each of the insulating resin layer 12 and the inorganic transparent electrode 13 at boundaries between the reflective regions R and the transmissive regions T enables prevention of conduction failure between the reflective regions R and the transmissive regions T without fail.

Figure 9:
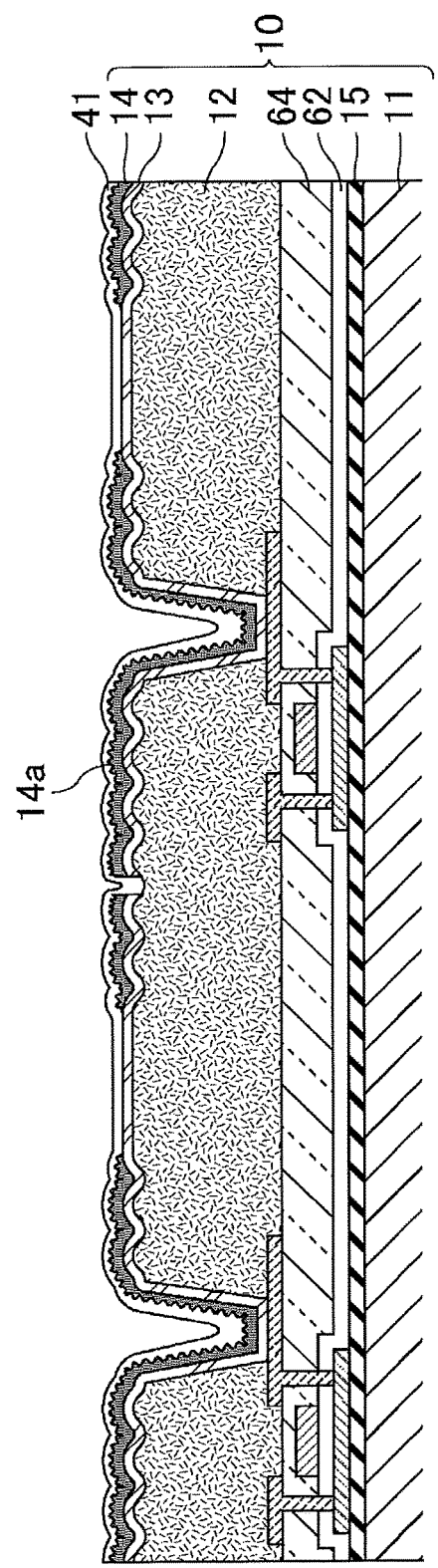
FIG. 9 is a schematic cross-sectional view showing a process which forms an alignment film.

The method for producing a liquid crystal display device may further include a process to form an alignment film on the first substrate 10. FIG. 9 is a schematic cross-sectional view showing a process which forms an alignment film. The formation method for the alignment film 41 may be any method such as a known method.

The second substrate (color filter substrate) 30 including the color filters 32 and the black matrix 33 and being provided on its surface with the alignment film 42 is prepared. The first substrate 10 and the second substrate 30 are bonded to each other with a sealant, and a liquid crystal composition is placed between the first substrate 10 and the second substrate 30, whereby the liquid crystal layer 20 is formed. The formation method for the liquid crystal layer 20 may be any method including a known method such as liquid crystal one drop filling (ODF) or vacuum filling.

The polarizing plate 51 is disposed on the side remote from the liquid crystal layer 20 of the first substrate 10, and the birefringent film 53 and the polarizing plate 52 are disposed on the side remote from the liquid crystal layer 20 of the second substrate 30, so that the liquid crystal panel 100 is completed. The backlight unit 200 is disposed on the back surface (first substrate 10 side) of the liquid crystal panel 100, and thereby the liquid crystal display device 1000 of the present embodiment is completed.

An embodiment of the present invention was described above. Each and every detail described above is applicable to all the aspects of the present invention.

The present invention is described in more detail based on the following examples and comparative examples. The examples, however, are not intended to limit the scope of the present invention.

EXAMPLE 1

In Example 1, a transflective liquid crystal display device was produced which included reflective regions including an insulating resin layer, an inorganic transparent electrode, and a reflective film, and transmissive regions including an insulating resin layer and an inorganic transparent electrode. The liquid crystal display device of Example 1 has the same structure as the liquid crystal display device 1000 shown in FIGS. 1 to 3.

In Example 1, a TFT substrate was produced by the method described with reference to FIGS. 4 to 9. A substrate including TFTs on a glass substrate was prepared. A photosensitive resin composition was applied to the substrate and then dried. The photosensitive resin composition used was an acrylic resin. The applied composition was shielded from light with a photomask, and then exposed to the ultraviolet light applied, followed by development. The insulating resin layer provided on its surface with the first projections and recesses in the reflective regions and with the smooth portions in the transmissive regions was thereby formed.

A transparent metal film was formed from ITO on the first projections and recesses and the smooth portions of the insulating resin layer by sputtering. The portions of the transparent metal film at the boundaries between the pixels were removed by photolithography and etching to separate the pixels, so that the inorganic transparent electrode was formed in each and every pixel. Here, the photolithography and etching were performed simultaneously, which allowed formation of contact holes such that the drain electrode of each TFT and the inorganic transparent electrode were electrically connected.

While a reflective film is formed from Al on all the surfaces of the portions of the inorganic transparent electrode corresponding to the reflective regions and the transmissive regions by sputtering, grain growth was caused during the formation of the reflective film by setting the substrate temperature to 200° C. and purging the film-forming device with Ar gas at a pressure of 0.1 Pa. Thereby, a reflective film provided on its surface with second projections and recesses was formed. The portions of the reflective film were then removed from the smooth portions corresponding to the transmissive regions and from the boundaries between the pixels by photolithography and etching, so that a first substrate (TFT substrate) was produced.

A color filter substrate (CF substrate) including, on a glass substrate, color filters, a black matrix, and a counter electrode formed from ITO was prepared as a second substrate. A vertical alignment film was formed on a surface of each of the CF substrate and the TFT substrate, and then rubbed for alignment treatment. A liquid crystal composition was placed between the CF substrate and the TFT substrate to form a liquid crystal layer. The substrates were bonded to each other with a sealant, whereby a liquid crystal panel was produced.

To the CF substrate side surface of the liquid crystal panel were bonded a $\lambda/4$ plate and a linearly polarizing plate in the given order. To the TFT substrate side surface was bonded another linearly polarizing plate such that the polarization axis thereof was perpendicular to the polarization axis of the linearly polarizing plate bonded to the CF substrate side surface. A backlight unit was disposed on the TFT substrate side. Thereby, the transflective liquid crystal display device of Example 1 was produced.

Comparative Example 1

In Comparative Example 1, a transflective liquid crystal display device was produced which included an inorganic transparent electrode only in the transmissive regions and included no inorganic transparent electrode in the reflective regions. In Comparative Example 1, as in Example 1, an insulating resin layer provided on its surface with first projections and recesses in reflective regions and with smooth portions in transmissive regions was formed on a substrate including TFTs. An inorganic transparent electrode was formed only in regions corresponding to the transmissive regions. No inorganic transparent electrode was formed in regions corresponding to the reflective regions. A reflective film was formed from Al on all the surfaces of the portions corresponding to the reflective regions and the transmissive regions by sputtering at room temperature (25° C.). In Comparative Example 1, the substrate was not heated after the formation of the reflective film. As in Example 1, the portions of the reflective film were then removed from the smooth portions corresponding to the transmissive regions and from the boundaries between the pixels, so that a TFT substrate was produced. With the TFT substrate, the liquid crystal display device of Comparative Example 1 was produced as in Example 1.

Comparative Example 2

In Comparative Example 2, a transflective liquid crystal display device was produced which included an inorganic transparent electrode only in transmissive regions and included no inorganic transparent electrode in reflective regions. In Comparative Example 2, the liquid crystal display device of Comparative Example 2 was produced as in Comparative Example 1, except that a reflective film was formed on all the surfaces of the portions corresponding to the reflective regions and transmissive regions during formation of the reflective film at a high temperature (300° C.). Also in Comparative Example 2, the substrate was not heated after the formation of the reflective film.

The structures of the reflective regions and the transmissive regions of the transflective liquid crystal display devices of the examples and comparative examples are shown in the following Table 1. The arithmetic mean heights of the surfaces of the insulating resin layer and the reflective film in the reflective regions and the surface of the insulating resin layer in the transmissive regions were measured with a surface roughness measuring device (OLS 5000 from Olympus Corporation). In the following Table 1, the case where the insulating resin layer, the inorganic transparent electrode, or the reflective film was formed in the reflective region or the transmissive region is marked as "Yes", and the case where such a member was not formed is marked as "No".

grain growth, so that no second projections and recesses were formed on the surface of the reflective film in the reflective regions.

In Comparative Example 2, the heating at the high temperature in the formation of the reflective film accelerated metal grain growth, so that the second projections and recesses were formed on the surface of the reflective film. However, since no inorganic transparent electrode was formed between the insulating resin layer and the reflective film, heating at the high temperature in the formation of the reflective film resulted in formation of projections and recesses also on the surface of the insulating resin layer in the transmissive regions, failing to maintain the smoothness.

The properties of the transflective liquid crystal display devices of the examples and the comparative examples, namely (1) the reflectance, (2) the transmittance, and (3) the display quality, were evaluated by the following respective methods. The results are shown in Table 2.

(1) Reflectance

For reflectance evaluation, the reflectance of the entire display region of the liquid crystal display device, including

TABLE 1

| | Structure of reflective region | | | | | | | |
|---|---|---|---|---|---|---|---|---|
| | Insulating resin layer | | | Inorganic transparent electrode | | Reflective film | | |
| | First projections and Formed recesses | Thickness | Formed | Thickness | Formed | Formation condition | Second projections and recesses |
| Example 1 | Yes | Formed (Sa = 200 nm) | 2 μm | Yes | 100 nm | Yes | High temperature (200° C.) | Formed (Sa = 30 nm) |
| Comparative Example 1 | Yes | Formed (Sa = 200 nm) | 2 μm | No | — | Yes | Room temperature (25° C.) | Not formed (Sa = 5 nm) |
| Comparative Example 2 | Yes | Formed (Sa = 200 nm) | 2 μm | No | — | Yes | High temperature (300° C.) | Formed (Sa = 100 nm) |

| | Structure of reflective region Reflective film | Structure of transmissive region | | | | | |
|---|---|---|---|---|---|---|---|
| | | Insulating resin layer | | | Inorganic transparent electrode | | Reflective film |
| | Thickness | Formed | Smooth surface | Thickness | Formed | Thickness | Formed |
| Example 1 | 100 nm | Yes | Formed (Sa = 5 nm) | 2 μm | Yes | 100 nm | No |
| Comparative Example 1 | 100 nm | Yes | Formed (Sa = 3 nm) | 2 μm | Yes | 100 nm | No |
| Comparative Example 2 | 100 nm | Yes | Not formed (Sa = 100 nm) | 2 μm | Yes | 100 nm | No |

In Example 1, the insulating resin layer and the inorganic transparent electrode were each continuously disposed at the boundaries between the reflective regions and the transmissive regions. This prevented open-circuits between the reflective regions and the transmissive regions, and formed the first projections and recesses on the surface of the reflective film in the reflective regions while maintaining the smoothness of the surface of the insulating resin layer in the transmissive region.

In Comparative Example 1, heating was performed at low temperatures in the formation of the reflective film. Thus, without the inorganic transparent electrode between the insulating resin layer and the reflective film, the first projections and recesses were formed on the surface of the insulating resin layer in the reflective regions while the smoothness in the transmissive regions was maintained. However, the low heating temperature for the substrate in the formation of the reflective film failed to cause metal both the reflective regions and the transmissive regions, was evaluated by the following method. The reflectance was measured using a spectrophotometer (CM-700d from Konica Minolta Japan, Inc.).

(2) Transmittance

The transmittance was determined by measuring the luminance of the backlight unit and the luminance of the entire display region of the liquid crystal display device, including both the reflective regions and the transmissive regions, using a spectroradiometer (SR-3 from Topcon Technohouse Corporation), and calculating the luminance of the entire display region of the liquid crystal display device relative to the luminance of the backlight unit in percentage.

(3) Display Quality

The transflective liquid crystal display devices of the examples and the comparative examples were driven. A solid image without any pattern was displayed in the display region. The display screen was visually observed from the direction vertically above the liquid crystal display device to determine whether or not the screen had display unevenness or color failure. The display screen was evaluated to have display unevenness when the image appeared to include different color depths, while the display screen was evaluated to have color failure when the whole or part of the screen showed a color different from the usual.

TABLE 2

|  | Reflectance (%) | Transmittance (%) | Display quality |
| --- | --- | --- | --- |
| Example 1 | 75 | 3 | Normal |
| Comparative Example 1 | 60 | 3 | Color failure |
| Comparative Example 2 | 75 | 1 | Display unevenness |

As shown in Table 1, the liquid crystal display device of Example 1 included the first projections and recesses on the surface of the insulating resin layer and the second projections and recesses on the surface of the reflective film in the reflective regions, and the smooth portions on the surface of the insulating resin layer in the transmissive regions. Thus, the liquid crystal display device of Example 1 enhanced the optical characteristics, i.e., the transmittance and the reflectance, without deteriorating the display quality.

In contrast, in Comparative Example 1, since the second projections and recesses were not formed on the surface of the reflective film, the reflectance decreased as compared with that in Example 1. Also, the pattern of the first projections and recesses was the only pattern of projections and recesses contributing to scattering, and thus the periodicity thereof caused interference, so that color failure was observed at a certain viewing angle.

In Comparative Example 2, since no smooth portions were formed on the surface of the insulating resin layer in the transmissive regions, the transmittance decreased as compared with that in Example 1. Also, since the first projections and recesses were formed in a self-alignment manner, the shapes thereof had a variation. The variation in shape of the first projections and recesses led to a variation in reflectance in the reflective regions, so that display unevenness was observed.

[Additional Remarks]

A first aspect of the present invention is directed to a liquid crystal display device including: a reflective region including an insulating resin layer, an inorganic transparent electrode disposed on the insulating resin layer, and a reflective film disposed on the inorganic transparent electrode; and a transmissive region including the insulating resin layer and the inorganic transparent electrode disposed on the insulating resin layer, wherein in the reflective region, the insulating resin layer is provided on a surface with first projections and recesses, the inorganic transparent electrode is disposed on the first projections and recesses, and the reflective film is provided on a surface with finer second projections and recesses than the first projections and recesses, in the transmissive region, the insulating resin layer is provided on the surface with a smooth portion, and the inorganic transparent electrode is disposed on the smooth portion, and the insulating resin layer and the inorganic transparent electrode are each continuously disposed at a boundary between the reflective region and the transmissive region.

In the first aspect of the present invention, the insulating resin layer may contain a photosensitive resin.

In the first aspect of the present invention, the reflective film may be a metal film.

A second aspect of the present invention is directed to a method for producing a liquid crystal display device, the device including a reflective region including an insulating resin layer, an inorganic transparent electrode disposed on the insulating resin layer, and a reflective film disposed on the inorganic transparent electrode, and a transmissive region including the insulating resin layer and the inorganic transparent electrode disposed on the insulating resin layer, the method including: forming the insulating resin layer provided on a surface with first projections and recesses in the reflective region and provided on the surface with a smooth portion in the transmissive region; forming the inorganic transparent electrode on the first projections and recesses and the smooth portion; forming on the inorganic transparent electrode the reflective film provided on a surface with finer second projections and recesses than the first projections and recesses; and removing a portion of the reflective film in the transmissive region.

In the second aspect of the present invention, the insulating resin layer may contain a photosensitive resin, and the insulating resin layer provided with the first projections and recesses and the smooth portion may be formed by photolithography.

In the second aspect of the present invention, the reflective film may be a metal film, the second projections and recesses may be formed during formation of the metal film, and the second projections and recesses may be formed by metal grain growth.

The above aspects of the present invention may appropriately be combined within the spirit of the present invention.

What is claimed is:

1. A method for producing a liquid crystal display device, the device including a reflective region including an insulating resin layer, an inorganic transparent electrode disposed on the insulating resin layer, and a reflective film disposed on the inorganic transparent electrode, and a transmissive region including the insulating resin layer and the inorganic transparent electrode disposed on the insulating resin layer, the method comprising:
   forming the insulating resin layer on a surface with first projections and recesses in the reflective region and on a surface with a smooth portion in the transmissive region;
   forming the inorganic transparent electrode on the first projections and recesses and the smooth portion;
   forming on the inorganic transparent electrode the reflective film provided on a surface with finer second projections and recesses than the first projections and recesses, the second projections and recesses being formed by metal grain growth; and
   removing a portion of the reflective film in the transmissive region.

2. The method for producing a liquid crystal display device according to claim 1,
   wherein the insulating resin layer contains a photosensitive resin, and
   the insulating resin layer provided with the first projections and recesses and the smooth portion is formed by photolithography.

3. The method for producing a liquid crystal display device according to claim 1, wherein the reflective film is a metal film, and
the second projections and recesses are formed during formation of the metal film.

\* \* \* \* \*